Figure 2:
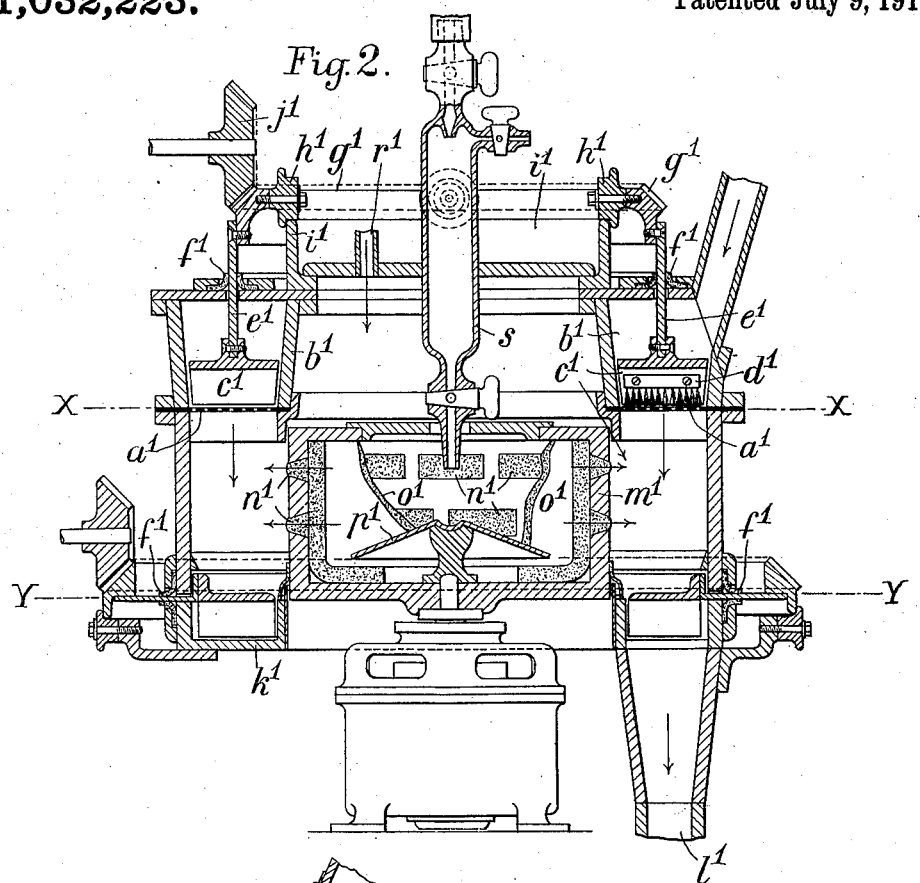

F. H. LORING.
APPARATUS FOR THE TREATMENT OF FLOUR, SEMOLINA, AND THE LIKE.
APPLICATION FILED MAR. 13, 1911.

1,032,223.

Patented July 9, 1912.

UNITED STATES PATENT OFFICE.

FREDERICK HENRY LORING, OF LONDON, ENGLAND.

APPARATUS FOR THE TREATMENT OF FLOUR, SEMOLINA, AND THE LIKE.

1,032,223. Specification of Letters Patent. Patented July 9, 1912.

Application filed March 13, 1911. Serial No. 614,159.

*To all whom it may concern:*

Be it known that I, FREDERICK HENRY LORING, a citizen of the United States, residing at London, England, have invented a new and useful Improved Apparatus for the Treatment of Flour, Semolina, and the Like, of which the following is a specification.

My invention relates to the treatment of flour, semolina and the like with liquids or other reagents in a fine state of subdivision, for the purpose of bringing about an improvement in the bread made from the finished product.

In some of the processes of this kind heretofore adopted, liquid has been sprayed into the flour through spraying nozzles by means of compressed air. This arrangement is open to the disadvantage that the flour is liable to be soiled by soot particles carried in suspension in the air used for spraying when such air is drawn from the atmosphere of smoky cities, and at the same time the nozzles are liable to become choked by flour adhering thereto and thus require constant cleaning, so that there is considerable difficulty in maintaining constant the rate at which the liquid is introduced into the flour, semolina or the like, the uniformity of treatment is impaired and loss is caused by having to interrupt the operation from time to time. According to the present invention, in order to obviate these disadvantages, the liquid or other reagent is applied to the exterior surface of a rapidly rotating body, *e. g.*, a cylinder, disk or other suitably shaped body, so as to be thrown off by centrifugal force in the form of a spray, mist or other form of cloud, through which the flour, semolina or the like is allowed to fall in a shower, so as either to come into contact or not with the surface of said rotating body. The liquid is applied to said exterior surface of the rotating body in such a manner that the orifice through which it issues is arranged in a space which is free or substantially free from flour, for example, the rotating body is made hollow with part of its peripheral wall made of porous material, the liquid or reagent being allowed to run into the interior thereof and pass to the exterior surface through the said porous material; or the said body may be arranged to rotate with the part on one side of its axis in a space through which the flour, semolina or the like is allowed to fall and with the part on another side of its axis in a space partitioned off from the former space and having the feeding device for the liquid or other reagent arranged therein.

By my improvements, the rotating body remains clean, since any particles of flour or semolina that may impinge thereon are thrown off again by centrifugal force, and the orifice through which the reagent passes to said rotating body remains unobstructed, so that the apparatus can work efficiently for long periods without requiring the work to be interrupted for cleaning, etc.

The flour, semolina or the like, passing in the form of a shower through the cloud or the like produced as above set forth, is preferably subjected simultaneously to the action of cold, for example, it is cooled by means of air from a refrigerating plant, whereby the cloud of reagent through which the shower of flour, semolina or the like falls, when such reagent consists of water or other liquid, will contain particles of frozen liquid.

Figure 1:
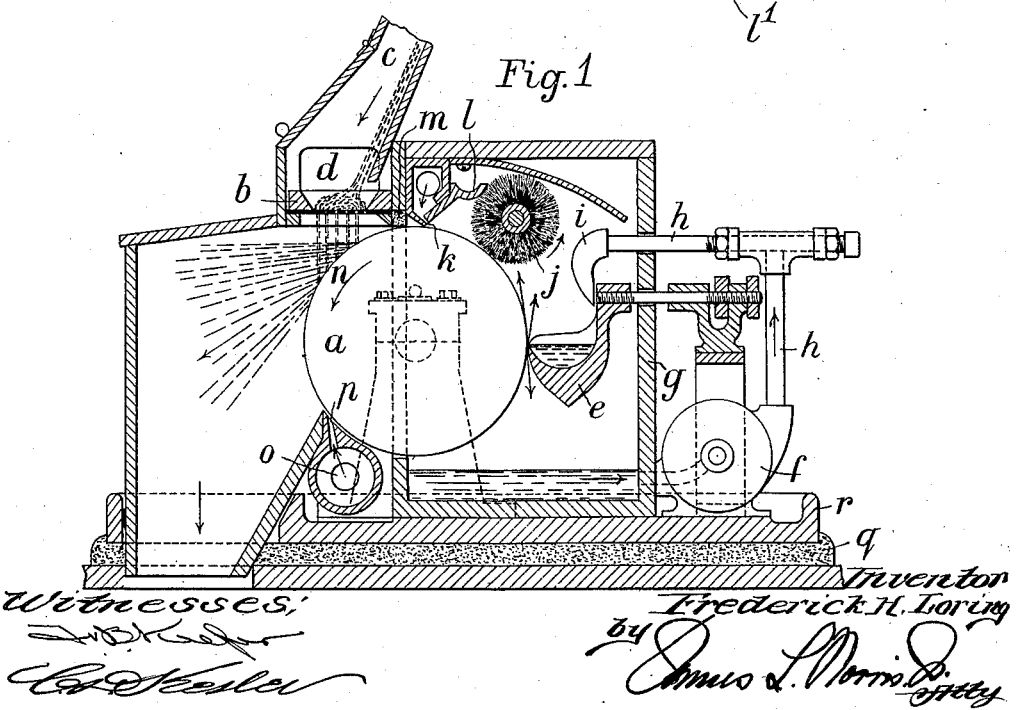

In the accompanying drawings:—Figure 1 shows one form of my improved apparatus in central vertical section, and Fig. 2 is a similar view illustrating a modified construction.

The apparatus shown in Fig. 1, which is intended for the treatment of semolina only, comprises a rotating hollow cylinder *a*, which is constructed of suitable non-oxidizing material and arranged to be driven at a high speed—for example, at a peripheral speed of three miles per minute. The semolina is brought into contact with the cylinder by a shaking sieve *b*, the semolina being delivered thereto through the spout *c*. An over-flow at *d* is provided, so that an excess of semolina would tail over and prevent the machine "blocking". The cylinder is moistened by the trough *e* shown in cross-section, which is fed by means of a suitable pump *f*, that draws its supply from the reservoir *g* and delivers it through pipes *h, h*, and an elongated nozzle *i*. The liquid flows over the lip of the trough *e* and some excess is thrown off from the cylinder, as indicated by the tangent arrows. The fine bristle-brush *j* is driven independently in the direction indicated, and removes a further excess of liquid. Behind the brush is an elongated air-nozzle *k*, which equalizes the film and removes droplets. Some of the thrown-off liquid is caught in the elongated cup $l$. The roller has now a moist film on it, as it passes under a stationary or traveling band of rubber $m$, which catches any spray that may form into drops and unduly moisten the semolina. The semolina is thrown off the cylinder at $n$, having been slightly moistened by contact with the wet cylinder revolving in the direction indicated. To prevent any flour, which always accompanies the semolina to a slight extent, from being carried into the part of the machine where the liquid is applied to the cylinder, an elongated nozzle $o$ is provided. Only a gentle blast of air issues from the slot $p$. A concrete or rubber foundation $q$ is provided for the cast-iron base-plate $r$ of the machine. It will be seen that the semolina comes in contact with a cool surface, and the atmosphere surrounding the machine is cooled by evaporation of the liquid therefrom.

Fig. 2 shows a modified construction applicable for the treatment of both semolina and flour, wherein the semolina (or flour) is allowed to fall in close proximity to the wet cylinder, but not in direct contact therewith. In this case a cylinder $m'$ is mounted on a vertical axis, although obviously, such mounting is not necessary to the invention, and the liquid fed on the inside. It will be apparent that the two designs, although quite different in appearance, are capable of being operated in the same way, and involve the same principle in dealing with the liquids by means of centrifugal force.

Instead of a shaking sieve, as in Fig. 1, the flour or semolina is caused to descend through a sieve $a'$ forming the bottom of a circular trough $b'$. Revolving sweepers (blades) and brushes $c'$ and $d'$ respectively, insure a thorough passage and a good distribution of the material. The mechanical arrangements are shown in some detail, but they may be modified considerably. The blades are supported by a tubular part $e'$ with dust-tight joints $f'$, the former in turn being fastened to a bevel gear-wheel $g'$ supported by flanged wheels $h'$ running on a circular track $i'$ and driven by a smaller bevel-gear $j'$. A similar arrangement delivers the material from a circular trough $k'$ into the exit spout $l'$. The cylinder $m'$ is provided with perforations or rectangular openings into which felt or suitable porous plugs or pads $n'$ are fitted. These plugs or pads are so made as to retain their shape when subjected to considerable centrifugal force. Water is supplied to the interior of the cylinder $m'$ by a spout $s$.

Additional absorbent material $o'$ is inserted and the liquid descends on the scattering plate $p'$. The liquid is thrown out, in the directions indicated by the arrows, in the form of a vapor, mist, or fine rain. In order to get quickly at the cylinder $m'$ as well as at other parts of the machine, the different sections of the latter are made separable along the planes X—X and Y—Y, the said sections being supported externally by a cast-iron frame, not shown.

Inasmuch as both of the above machines operate as cooling devices, owing to the lowering of the temperature due to the excessive evaporation, further cooling of the solutions is not always necessary, but the application of artificial cold to the solutions, or the products thrown off by centrifugal force, may be resorted to in some cases with considerable advantage. Even the flour or semolina may be cooled by the direct application of cold air or chilled surfaces in a suitable agitator, or other machine, in which the flour or like material tumbles about.

Cold air can be introduced into the centrifugal machines, preferably through the pipe $r'$, Fig. 2, or nozzle $o$, Fig. 1. In some cases fine snow is produced, which passing into the flour assists in cooling it.

It is a matter of experiment for the miller to determine the quantities of any liquid or reagent desirable in a given batch of flour, and the extent to which the cooling of the products should be carried is also best determined by the usual tests on the finished flour.

I claim:—

1. Apparatus for the treatment of cereal milling products, comprising a rotary member, means for delivering a liquid to the exterior peripheral surface of the said member, means for distributing the material to be treated in a shower passing in proximity to the said surface and means for rotating said member at a high speed.

2. Apparatus for the treatment of cereal milling products, comprising a rotary member, means for delivering a liquid to the exterior peripheral surface of the said member, means for distributing the material to be treated in a shower passing in proximity to the said surface, and means for delivering cold air into the space through which the said material thus descends.

3. Apparatus for the treatment of cereal milling products, comprising two chambers, a rotary member forming part of the partition between said chambers, means arranged in one chamber for delivering a liquid to the exterior peripheral surface of said rotary member, means for distributing the material to be treated in a shower passing through the other chamber, and means for rotating said rotary member at a high speed.

4. Apparatus for the treatment of cereal milling products, said apparatus comprising a frame, a sieve mounted in said frame, means for delivering the milling products onto said sieve, means for distributing said products over said sieve, a rotary member mounted in said frame and having a peripheral surface adjacent to and at a lower level than said sieve, means for delivering a liquid to said peripheral surface, and means for rotating said rotary member at a high speed.

5. Apparatus for the treatment of cereal milling products, said apparatus comprising a sieve, means for delivering the milling products onto said sieve, means for distributing said products over said sieve, a rotary member having a peripheral surface adjacent to and at a lower level than said sieve, means for delivering a liquid to said peripheral surface, and means for cooling the air in the space below said sieve through which said milling products descend.

6. Apparatus for the treatment of cereal milling products, said apparatus comprising means for bringing said products into the form of a shower, a hollow rotary member having a peripheral surface adjacent to the space in which said shower is produced, porous material in the peripheral wall of said rotary member, means for supplying a liquid to the interior of said rotary member, and means for rotating said member at a high speed.

7. An apparatus for the treatment of cereal milling products, said apparatus comprising a sieve, means for delivering said products onto said sieve, means for distributing said products over said sieve, a hollow rotary member having a peripheral surface adjacent to and at a lower level than said sieve, porous material in the peripheral wall of said rotary member, means for supplying a liquid to the interior space of said rotary member, and means for rotating said member at a high speed.

FREDERICK HENRY LORING.

Witnesses:
JOHN THOMAS KNOWLES,
THOMAS ALFRED BAILEY.

---

Copies of this patent may be obtained for five cents each, by addressing the "Commissioner of Patents, Washington, D. C."